Aug. 9, 1927.
H. P. HIMES
1,638,336
ELECTRIC ARC WELDING
Filed April 14, 1921
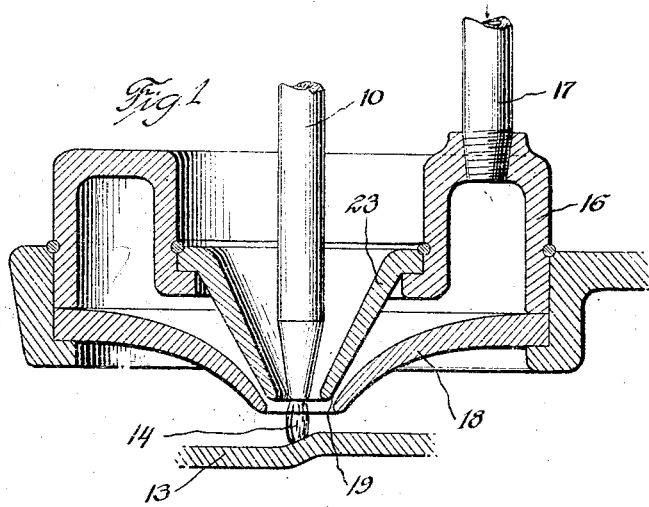
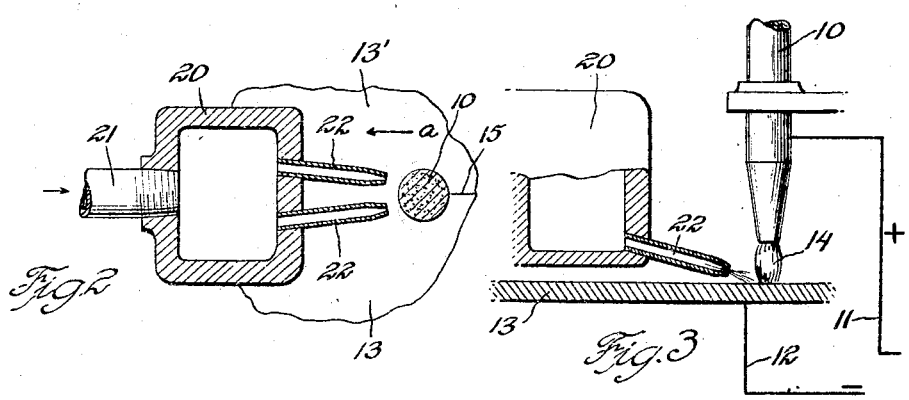
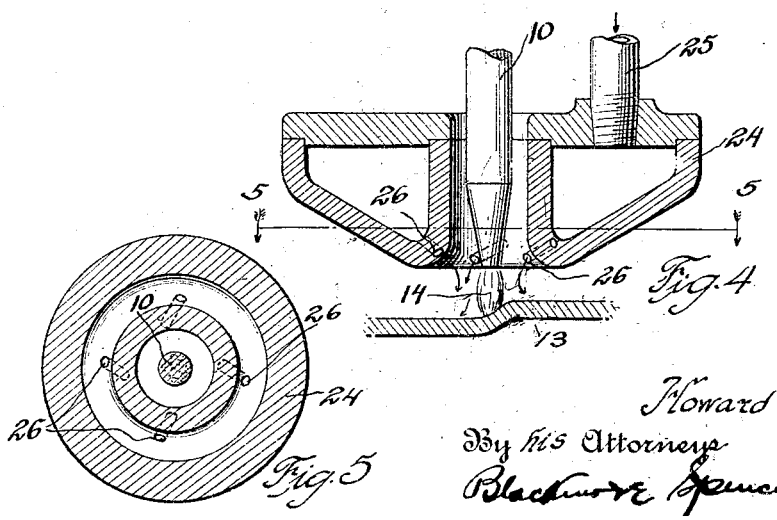
Inventor
Howard P. Himes
By his Attorneys Patented Aug. 9, 1927.

1,638,336

UNITED STATES PATENT OFFICE.

HOWARD P. HIMES, OF DETROIT, MICHIGAN, ASSIGNOR OF ONE-HALF TO GENERAL MOTORS CORPORATION, OF DETROIT, MICHIGAN, A CORPORATION OF DELAWARE.

ELECTRIC-ARC WELDING.

Application filed April 14, 1921. Serial No. 461,325.

The invention relates to the treatment of materials and more particularly metals by the electric arc and especially to metal-working operations in which the metal under treatment forms a part of the electric circuit and in which the arc is caused to play upon the surface of the metal.

In the operation of electric arc apparatus of this type, for example arc welding or cutting apparatus, the arc tends to spread over a considerable area. Furthermore, owing to slight differences in conductivity or other varying conditions in the arc or the immediately adjacent portions of the electrode or work piece, the arc tends to wander or jump from point to point, thereby rendering the path of the arc more or less irregular and resulting in a lack of uniformity in the heating effects.

Another disadvantage attendant upon the use of the arc for such operations as welding consists in the tendency for slag to form in or upon the molten metal, thereby causing lack of homogeneity in the metal after solidification, resulting in flaws in the seam and roughness in the surface.

The invention has for one of its objects, therefore, the provision of means whereby the arc may be controlled and directed and the field or path in which the arc operates upon the metal surface may be definitely limited or determined.

A further object is to provide for the removal of slag or like materials from the surface of the metal which has been brought to a state of fusion under the heat of the arc.

With these and other objects in view, as will appear more fully from the following description, the invention comprises the features of novelty hereinafter described and set forth in the appended claims.

In the practice of my invention I propose to apply to the arc, or to cause to pass in proximity thereto, a current or currents of a gaseous medium, as, for example, air, by which means it is possible not only to deflect and direct or confine the arc as desired, but also to blow molten impurities or slag from the surface of the metal and thereby leave in the path of the arc a relatively smooth, narrow seam with well defined edges of substantially regular contour and with uniform excellence in the continuity and homogeneity of the metal.

Since by the use of my invention the arc may be confined to a narrower and more accurately defined path than would ordinarily be obtainable, it will be seen that the cutting of plates or sheets by the heat of the arc may also be accomplished with marked advantages in speed and accuracy.

The gaseous medium employed may be directed against the arc from one or more sides by means of suitably arranged nozzles, or it may be utilized in the form of a sheet or curtain surrounding the arc to a greater or less extent and consisting of a stream of the medium flowing toward the point of application of the arc to the work.

Currents may also be directed tangentially to the arc operating to produce a spiral or vortical action immediately surrounding the arc.

Although I have referred to the use of air, and such gaseous medium owing to its convenience would be generally employed as a directing, deflecting, or confining agency, it is not intended to limit the invention to the use of air, as it will be understood that special circumstances may arise under which, because of peculiarities in material or in the effects to be produced, it may be desirable to utilize other media.

In the accompanying drawings, illustrating means for carrying out the method referred to above, Fig. 1 is a vertical section showing one embodiment of means for carrying out the process of the invention;

Fig. 2 is a horizontal sectional view and Fig. 3 an elevation partly in section showing another embodiment of such means;

Fig. 4 is a vertical section showing still another embodiment; and

Fig. 5 is a section on line 5—5 of Fig. 4.

Referring to the drawings, 10 indicates an electrode which may be of carbon or other conducting material and may be supported in any usual or suitable manner to be raised and lowered. This electrode is connected to any suitable source of current, conventional circuit connections 11, 12, being shown in Fig. 3. A workpiece 13 is connected in circuit with the electrode 10 and serves preferably as the other electrode between which and electrode 10 an arc may be produced as at 14. The workpiece will be, of course, of conductive material, and will generally comprise a metal object the surface of which is to be subjected to treatment by the electric arc, such as fusing, cutting, or welding. As shown in Fig. 2, a plurality of plates 13, 13', may be positioned with their edges adjacent, as at 15, and an arc may be produced at the junction of the plates to thereby weld the edges together.

The means for directing around or against the arc a stream or streams of a gaseous medium may take the form illustrated in Fig. 1, in which is shown an annular hollow body 16 having a connection 17 through which a gas may be supplied under pressure to the chamber within the body 16. To the lower edges of the body 16 are connected two annular members 18, 23, of approximately frusto-conical outline, which members will be preferably of refractory material adapted to withstand the elevated temperature to which they will be subjected because of their proximity to the electric arc. The members 18, 23, are so shaped and mounted as to provide between their inner edges an annular passage 19 surrounding and in close proximity to the end of the electrode 10. The annular nozzle thus formed serves to direct the gaseous medium from the interior of the body 16 against the arc and the adjacent portions of the workpiece in a sheet or curtain entirely surrounding the arc. This arrangement provides a curtain of moving air or other gas operating uniformly upon all sides of the arc and tending to prevent the arc from wandering or jumping in accordance with slight variations in the resistance offered to flow of current.

In the apparatus as illustrated in Figs. 2 and 3, a chamber 20 is provided, connected to a source of supply of gas, as by pipe 21, and from which extend one or more nozzles 22. The nozzles are arranged preferably in pairs converging toward the arc 14. The nozzle or nozzles are also mounted at a slight angle to the horizontal or to the surface of the workpiece so that the stream or streams of air may be directed both against the arc and the surface of the metal adjacent the point of application of the arc. The converging arrangement serves to direct the streams of gas against the sides of the arc in such manner as to act as a screen confining the arc laterally and also to deflect it in the direction of the blast, thereby tending to narrow the path of the arc and greatly facilitating the operation of forming a clean narrow cut or a smooth and uniform seam with accurately defined edges. The blast also operates to remove from the fused surface the slag or other liquefied impurities formed by the action of the arc and thereby contributes to the uniformity and solidity of the fused metal and the smoothness of the surface. It has been observed also that the deflecting current serves to maintain a substantially uniform length of arc when encountering slight irregularities in the surface, the arc being deflected to a greater extent as the gap between the electrode and workpiece shortens and to a less extent as the gap lengthens.

As shown in Fig. 2, the direction of the stream or streams of gas is opposite to the direction of progress of the welding or other operation performed by the arc, either the work 13 being moved in the direction indicated by the arrow $a$ or the welding head being moved in the opposite direction. The stream of gas therefore serves to hasten the cooling of the area already treated. Whether for this reason, or because of the removal of slag, or for other reasons not now apparent, it has been found that the fused metal after again solidifying, is softer than has been hitherto produced by fusion by the ordinary arc welding process.

In the form of apparatus in Figs. 4 and 5, an annular hollow body 24 is connected by the pipe 25 to a suitable source of gas under pressure. The body 24 is mounted with its inner periphery in proximity to the electrode 10 and provided with a plurality of delivery passages or nozzles 26 which are arranged tangentially to the electrode 10 so that a whirling current of gas may be supplied around the arc thereby serving to confine the area of application of the arc and provide an annular gaseous screen therefor.

While I have shown and described herein the forms of apparatus which are now deemed most suitable for applying the process of my invention, I am aware that other forms may be similarly utilized and therefore I do not desire to be limited in any way to the forms described. Various other changes in details of construction and operation may be made without departing from the scope of the invention or sacrificing its advantages.

I claim:

1. The process which comprises producing an electric arc between an electrode and a workpiece in circuit with the electrode and directing a gaseous medium against the arc from the sides thereof with sufficient force and in sufficient quantity to confine the application of the arc to an area and position determined by the movement of said medium.

2. The process of welding with an electric arc produced between an electrode and a workpiece in circuit therewith comprising the directing of a stream of gas forcibly against the metal in a plane nearly at right angles to the electrode while under the action of the arc in such manner as to thereby remove impurities from the surface of the fused metal.

3. The process of controlling the position on a workpiece of an electric arc formed between an electrode and said workpiece which comprises directing laterally against said arc a plurality of streams of gas converging on said position in a plane at an acute angle to the plane of the work.

4. The process of restricting the area of a workpiece operated upon by an electric arc and removing from the surface products of the action of the arc comprising the directing of a plurality of streams of gas against the arc and workpiece adjacent the point of contact thereof from opposite sides of its line of travel.

5. The process of electric welding comprising the forming of an arc between an electrode and a workpiece, producing relative movement to cause the arc to travel over the surface of the workpiece, and directing a stream of gas upon the arc and work in the direction of travel of the arc over the work.

6. Apparatus for treating a metal object with an electric arc which comprises an electrode in circuit with the said metal, means for supplying current to produce an arc between said electrode and said metal, and means for directing gas in proximity to the sides of said arc in a plane substantially at right angles to the electrode to confine the arc and limit the area of its action.

7. In electric welding apparatus the combination of means for producing an electric arc between an electrode and a workpiece, and means for directing a plurality of streams of gas laterally against said arc, said streams being so applied as to create a gaseous curtain forcibly directing the arc in a predetermined direction and limiting its area of action upon the work.

8. In electric welding apparatus the combination of means for producing an electric arc between an electrode and a workpiece and a plurality of nozzles adapted to deliver streams of gas against the arc in directions substantially at right angles to the electrode, said nozzles arranged to converge toward the arc.

9. The process of applying heat to a workpiece with an electric arc which comprises producing an arc between an electrode and the workpiece and controlling the direction of and area acted upon by the arc by directing a gaseous medium laterally against the arc from different directions in such manner as to produce around the arc a gaseous curtain adapted to determine the direction of the arc and limit the area of its application to the workpiece.

In testimony whereof I affix my signature.

HOWARD P. HIMES.